(12) United States Patent
Lee et al.

(10) Patent No.: US 9,286,474 B2
(45) Date of Patent: Mar. 15, 2016

(54) ENCODING APPARATUS AND METHOD

(71) Applicant: ELECTRONICS AND TELECOMMUNICATIONS RESEARCH INSTITUTE, Daejeon (KR)

(72) Inventors: Seung-Kwang Lee, Daejeon (KR); Doo-Ho Choi, Cheonan (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 35 days.

(21) Appl. No.: 14/250,950

(22) Filed: Apr. 11, 2014

(65) Prior Publication Data
US 2015/0127953 A1  May 7, 2015

(30) Foreign Application Priority Data
Nov. 4, 2013  (KR) .......................... 10-2013-0133170

(51) Int. Cl.
G06F 11/30 (2006.01)
G06F 21/60 (2013.01)

(52) U.S. Cl.
CPC ..................................... *G06F 21/602* (2013.01)

(58) Field of Classification Search
USPC ......................................................... 713/189
See application file for complete search history.

(56) References Cited

U.S. PATENT DOCUMENTS

| 7,397,916 | B2* | 7/2008 | Johnson et al. ................. 380/28 |
| 7,809,135 | B2 | 10/2010 | Johnson et al. |
| 8,175,265 | B2* | 5/2012 | Ciet et al. ........................ 380/29 |
| 8,306,216 | B2* | 11/2012 | Michiels et al. ................ 380/28 |
| 2012/0002807 | A1 | 1/2012 | Michiels et al. |

OTHER PUBLICATIONS

S. Chow et al., "White-Box Cryptography and an AES Implementation," *Selected Areas in Cryptography*, Aug. 2002, pp. 1-18.
O. Billet et al., "Cryptanalysis of a White Box AES Implementation," *Selected Areas in Cryptography*, Aug. 2004, pp. 227-240.
W. Michiels et al., "Cryptanalysis of a Generic Class of White-Box Implementations," *Selected Areas in Cryptography*, Aug. 2008, pp. 214-428.
S. K. Lee et al., "Conditional Re-encoding Method Resistant to Cryptanalysis for White-box AES Algorithm," *The 9th Conference on Defense Technology*, vol. 9, Oct. 2013, pp. 187-188.

* cited by examiner

*Primary Examiner* — Amare F Tabor
(74) *Attorney, Agent, or Firm* — Staas & Halsey LLP (57) ABSTRACT

Provided is an encoding apparatus including a communication unit configured to receive data from an outside, a memory configured to store an instruction for encoding the data, and a processor configured to encode the data according to the instruction, in which the instruction includes an instruction for encoding the data using a first table for looking up and calculating a result value obtained by encoding according to a predetermined pattern in an a-th round, and when among first to fourth data included in data obtained by encoding through the first table, an i-th bit of exclusive OR of the second to fourth data and a j-th bit of the first data are different, an instruction for encoding the data using a second table for looking up and calculating a result value calculated by performing additional encoding on exclusive OR of the first to fourth data.

4 Claims, 5 Drawing Sheets

Generating the proposed Type IV_III

```
for (rnd = 0; rnd < 9; ++rnd) {
 for (row = 0; row < 4; ++row) {
  for (col = 0; col < 4; ++col) {
   for (pair = 0; pair < 3; ++pair) {
    \* offSet distinguishes
       the upper and the lower 4 bits of a byte *\
      for (offSet = 0; offSet < 2; ++offSet) {
       x_dec_table =
           &(InvE1)[rnd][row][col][pair * 2 + offSet][0];
       y_dec_table =
           &(InvE2)[rnd][row][col][offSet][0];

if (pair == 2) {
        y_dec_table =
          &InvE1[rnd][row][col][((pair+1)*2) + offSet][0];
       }
       for (x = 0; x < 16; ++x) {
        for (y = 0; y < 16; ++y) {
         x_dec = x_dec_table[x];
         y_dec = y_dec_table[y];
         xy_index = x || y;
         xy_xored = x_dec ^ y_dec;
         encoded_output = E2[rnd][row][col][offSet][xy_xored];

\* compare x(1) and x(2) at pair 0 *\
         if((pair == 0) && ( (x & 0x01) ^ (y & 0x02) == 1))
             encoded_output =
                 E3[rnd][row][col][offSet][encoded_output];

TypeIV[rnd][row][col][pair][offSet][xy_index]
               = encoded_output;
        }
      ...
}
```

ENCODING APPARATUS AND METHOD

CROSS-REFERENCE TO RELATED APPLICATION

This application claims priority to and the benefit of Korean Patent Application No. 10-2013-0133170, filed on Nov. 4, 2013, the disclosure of which is incorporated herein by reference in its entirety.

BACKGROUND

1. Field of the Invention

The present invention relates to encoding and decoding techniques, and more particularly, to encoding and decoding techniques using a white-box advanced encryption standard (AES).

2. Discussion of Related Art

A white-box model is an environment in which attackers can access all resources available for execution of software. Encoding apparatuses designed to be safe in even the white-box model use the white-box AES.

The conventional white-box AES is known as having an attack complexity that can prevent a brute force attack under a white-box attack environment, but is found to be analyzed at an attack complexity of $2^{30}$ by an attack using algebraic analysis.

The related art is disclosed in (Non Patent Literature 1) Cryptanalysis of a White Box AES Implementation, Olivier Billet, Appeared in H. Handschuh and A. Hasan (Eds.): SAC 2004, LNCS 3357, pp. 227-240, 2005.

SUMMARY OF THE INVENTION

The present invention is directed to an encoding apparatus using a white-box encoding table by performing additional encoding according to comparison between designated bits that are included in data to be encoded.

According to an aspect of the present invention, there is provided an encoding apparatus based on a white-box advanced encryption standard (AES), the encoding apparatus including: a communication unit configured to receive data from an outside; a memory configured to store an instruction for encoding the data; and a processor configured to encode the data according to the instruction, in which the instruction may include an instruction for encoding the data using a first table for looking up and calculating a result value obtained by encoding according to a predetermined pattern in an a-th round, and when among first to fourth data included in data obtained by encoding using the first table, an i-th bit of exclusive OR of the second to fourth data and a j-th bit of the first data are different, an instruction for encoding the data using a second table for looking up and calculating a result value calculated by performing additional encoding on exclusive OR of the first to fourth data (a, i, and j being each a natural number of 1 or more).

When the additional encoding is performed on the data in the a-th round, the instruction may further include an instruction for additionally decoding the data obtained by the additional encoding among data obtained by encoding using the second table in an (a+1)th round and then encoding the data obtained by encoding using the second table, using the first table for looking up and calculating a result value obtained by encoding according to a predetermined pattern.

The instruction may further include an instruction for creating additional encoding information indicating whether the additional encoding is performed, in which the encoding using the first table of the data obtained by encoding using the second table may include determining whether the additional encoding is performed on the data in the a-th round with reference to the additional encoding information.

The first table may be a Type II, Type IV_II, or Type III table according to the white-box AES, and the second table may be a Type IV_III table according to the white-box AES.

According to another aspect of the present invention, there is provided a method of encoding data by an encoding apparatus based on a white-box advanced encryption standard (AES), the method including: receiving data from an outside; encoding the data using a first table for looking up and calculating a result value obtained by encoding according to a predetermined pattern in an a-th round; and when among first to fourth data included in data obtained by encoding using the first table, an i-th bit of exclusive OR of the second to fourth data and a j-th bit of the first data are different, encoding the data using a second table for looking up and calculating a result value calculated by performing additional encoding on exclusive OR of the first to fourth data.

The method may further include creating additional encoding information indicating whether the additional encoding is performed; and additionally decoding the data obtained by the additional encoding among data obtained by encoding using the first table with reference to the additional encoding information and then encoding the data obtained by encoding using the first table, using the second table for looking up and calculating a result value obtained by encoding according a predetermined pattern.

The method may further include creating additional encoding information indicating whether the additional encoding is performed, in which the encoding using the first table of the data obtained by encoding using the second table may include determining whether the additional encoding is performed on the data in the a-th round with reference to the additional encoding information.

The first table may be a Type II, Type IV_II, or Type III table according to the white-box AES, and the second table may be a Type IV_III table according to the white-box AES.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

While example embodiments of the invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that when one element is referred to as "transmitting" a signal to another element, the one element can transmit a signal to the other element directly or via intervening elements if there is no specific limitation.

Figure 1:
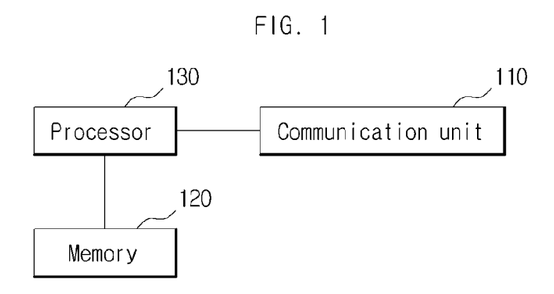
FIG. 1 is a view illustrating an encoding apparatus according to an embodiment of the present invention.

FIG. 1 is a view illustrating an encoding apparatus according to an embodiment of the present invention.

Referring to FIG. 1, the encoding apparatus includes a communication unit 110, a memory 120, and a processor 130.

The communication unit 110 receives data including a plaintext to be encoded from an external apparatus under control of the processor 130. The communication unit 110 stores a received image to the memory 120. In addition, the communication unit 110 may be connected with a decoding device to transmit encoded data over a communication network.

The memory 120 stores an instruction for encoding data using a white-box table.

The processor 130 encodes data according to the instruction stored in the memory 120 and transmits the encoded data to the decoding device via the communication unit 110. The decoding device is a device for decoding the encoded data that is received from the communication unit 110 using a well-known white-box AES.

A process in which the processor 130 encodes data according to the instruction stored in the memory 120 will be described in detail below with reference to FIGS. 2 to 4.

Figure 2:
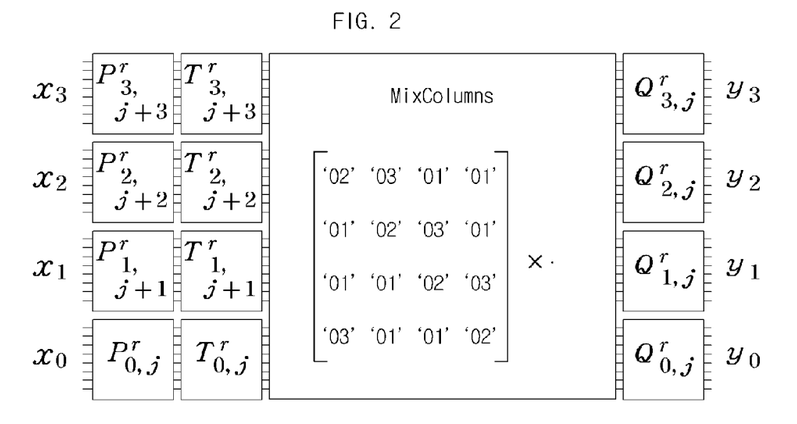
FIG. 2 is a view illustrating one round of a conventional white-box AES.

FIG. 2 is a view illustrating one round of a conventional white-box AES.

Referring to FIG. 2, P ($P^r_{0,j}, P^r_{1,j+1}, P^r_{2,j+2}, P^r_{3,j+3}$ of FIG. 2) performs non-linear decoding (4-bit concatenated decoding) for input decoding and 8-bit to 8-bit mixing bijection, and Q ($Q^r_{0,j}, Q^r_{1,j+1}, Q^r_{2,j}, Q^r_{3,j}$ of FIG. 2) performs 8-bit to 8-bit mixing bijection and non-linear encoding for output encoding, which are cancelled by P in the next ground. In this case, r represents a round, and j is one of 0 to 3. Accordingly, P receives data (a state matrix including 4×4 data values, each data value having one byte), which has been encoded and output in a previous round, by 4 bytes and performs input decoding of the data.

Recently, an attack against the white-box AES using an algebraic analysis technique is introduced. The algebraic analysis technique is performed according to following three steps:

1. Transform an output encoding Q to an affine function;
2. Find a linear part of the output encoding Q; and
3. Remove input encoding P to extract a key.

The first step is to remove a non-linear encoding of a hidden round.

In order to create a simple table between an input and an output for each round to perform transformation to an affine function, (x1, x2, x3) among 4 bytes (x0, x1, x2, x3) of the input data are fixed as (c1, c2, c3) and thus a function y0 (x0, c1, c2, c3) having an input of x0 and an output of y0 may be expressed as follows.

$$y0(x0,c1,c2,c3)=Q_{0,j}^r(\alpha T_{0,j}^r(P_{0,j}^r(a0)))\oplus\beta_c$$

where x0 is a natural number from 0 to 255, and the other fixed constants are fixed as βc by the well-known MixColumns operation. In this case, when the fixed constants are replaced by (c1, c2, c3), the following equation may be obtained.

$$y0(x0,c1,c2,c3')=Q_{0,j}^r(\alpha T_{0,j}^r(P_{0,j}^r)(x0))\oplus\beta_{c'}$$

A set of functions satisfying Theorem 1 below may be created as a table by combining the above two equations.

$$y0(x0,c1,c2,c3)\cdot y0(x0,c1,c2,c3')^{-1}=Q_{0,j}^r(Q_{0,j}^{r^{-1}}(x_0)\oplus\beta)$$

$$\beta=\beta_c\oplus\beta_{c'}$$

Theorem 1. For a set of functions Q that are given as a value, $$S=\{Q\cdot\oplus_\beta\cdot Q\}_\beta\in GF \quad (28)$$

Q replacement in GF ($2^3$)

A replacement Q', which is an affine function, may be found using A.

$$Q'=Q\cdot A$$

Theorem 1 is based on algebraic analysis on WB-AES algorithm.

The well-known algebraic analysis technique uses Theorem 1. The encoding apparatus according to an embodiment of the present invention proposes an encoding method that disables an algebraic analysis technique according to Theorem 1.

Figure 3:
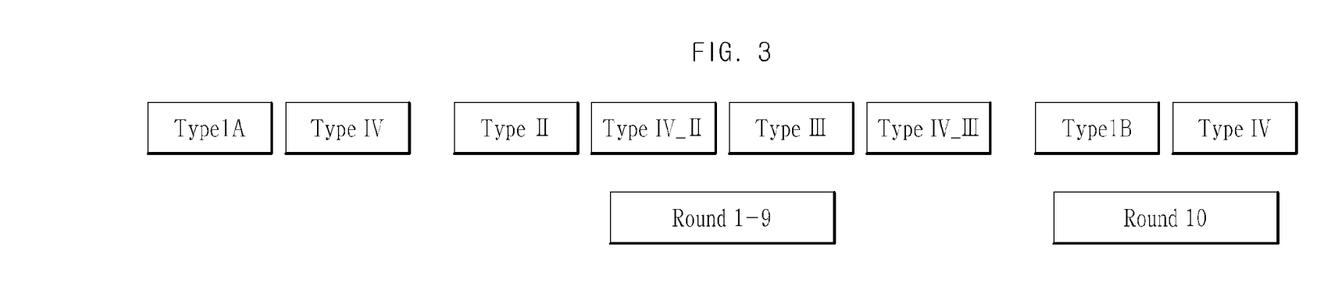
FIG. 3 is a view illustrating each table used by an encoding apparatus according to an embodiment of the present invention while the white-box performs encoding.

FIG. 3 is a view illustrating each table used by an encoding apparatus according to an embodiment of the present invention while the white-box performs encoding.

Referring to FIG. 3, the encoding apparatus performs encoding by looking up a table using white-box encoding tables Type IA, Type IB, Type II, Type III, Type IV, Type IV_II, and Type IV_II. A process in which an encoding apparatus performs encoding is divided into first to tenth rounds. For example, the encoding apparatus performs a first round process that transforms data including a plaintext through Type IA and Type IV and then transforms the data through Type II, Type IV_II, Type III, and Type IV_II. Subsequently, the encoding apparatus repetitively performs data transformation through Type II, Type IV_II, Type III, and Type IV_II during the second to ninth rounds, using a result value of Type IV_II of a previous round as an input value. After the ninth round is completed, the encoding apparatus completes an encoding process using the tenth round data transformation through Type IB and Type IV. In this case, Type IA is a table for deriving the same data as acquired by performing input decoding, 128*8 mixing bijection, 128*128 inverse mixing bijection (8*8 extension), and output encoding in a look-up table manner, Type III is a table for deriving the same data as acquired by performing input decoding, 32*32 inverse mixing bijection, 8*8 inverse mixing bijection, and output encoding in a look-up table manner, and Type IV and Type IV_II are tables for deriving the same data as acquired by performing input decoding, 4-bit XOR, and output decoding in a look-up table manner. An operation process for each table is well known, and thus detailed description thereof will be omitted.

In addition, Type IV_II may be a table for deriving a value through additional encoding under predetermined conditions and the above-described operation processes according to Type IV and Type IV_II. In this case, Type IV_II is a table for performing an XOR operation on two 4 bit inputs among values calculated through Type III, that is, a table for performing an XOR operation, which will be described below, on 4-byte input (x0, x1, x2, x3).

In this case, each table has a multi-dimensional array, and Type II, Type IV_II, Type III, and Type IV_II may include all tables corresponding to the first to ninth rounds. In addition, Type E may be a table having a multi-dimensional array, which includes both a table in which additional decoding is performed and a table in which additional decoding is not performed.

Figure 4:
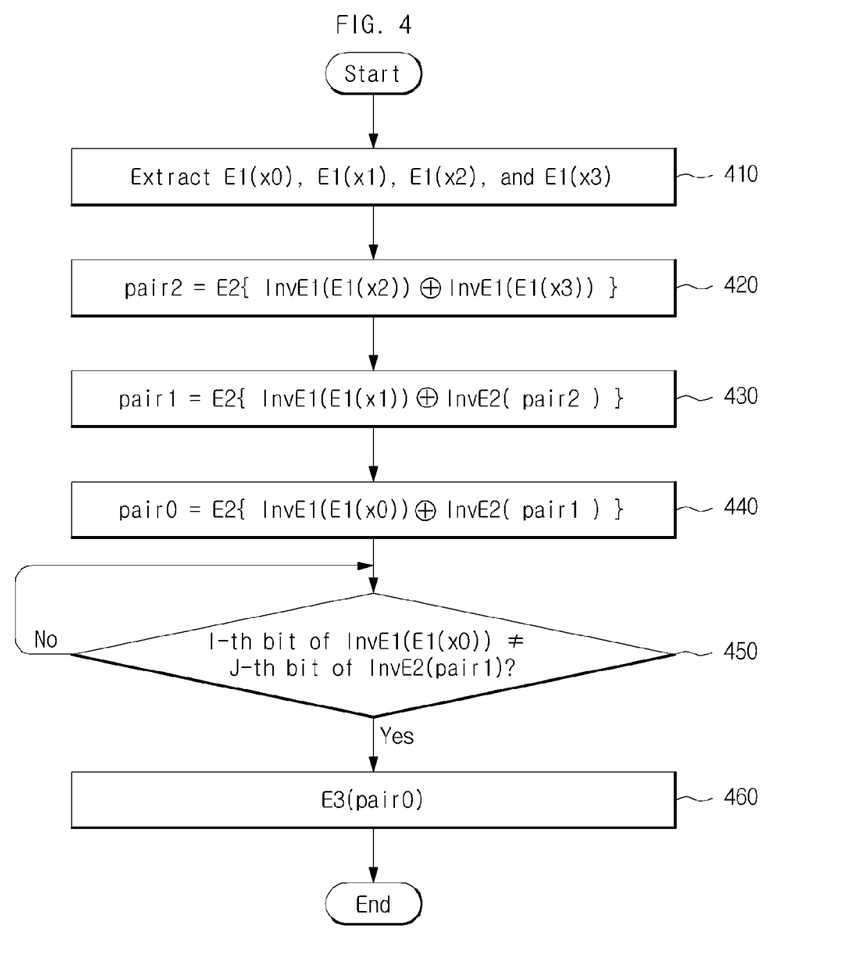
FIG. 4 is a flowchart illustrating an encoding process corresponding to Type IV_III of an encoding apparatus according to an embodiment of the present invention.

FIG. 4 is a flowchart illustrating an encoding process corresponding to Type IV_III of an encoding apparatus according to an embodiment of the present invention. A process that will be described below relates to an encoding process corresponding to Type IV_III, and an actual encoding apparatus according to an embodiment of the present invention performs an encoding process through Type IV_III, which is a look-up table for deriving the same result as acquired through a process that will be described below. However, for simple and clear description of the present invention, a process illustrated in FIG. 4 will be described as a process performed by the encoding apparatus. In addition, as described below, InvE1 is an input decoding table created in Type III, E2 is an output encoding table that is predetermined to be used for encoding according to Type IV_III, InvE2 is an output decoding table that is referenced to decode the data encoded by E2, and E3 is an encoding table that is predetermined to be referenced in additional encoding.

Referring to FIG. 4, in operation 410, the encoding apparatus extracts four O-bit data values E1(a0), E1 (a1), E1(a2), and E1(a3) from a result of Type III. In this case, E1(a0), E1(a1), E1(a2), and E1(a3) may be obtained by encoding four 4-bit data values a0, a1, a2, and a3 according to Type III.

In operation 420, the encoding apparatus decodes two 4-bit data values E1(a2) and E1(a3) through InvE1 and encodes a result, which is obtained by performing XOR on the decoded values, on the basis of E2 to calculate pair2.

In operation 430, the encoding apparatus encodes a result obtained by performing XOR on a value obtained by decoding the 4-bit data E1(a1) based on InvE1 and a value obtained by decoding pair2 based on InvE2 to calculate pair1 based on E2.

In operation 440, the encoding apparatus encodes a result obtained by performing XOR on a value obtained by decoding the 4-bit data E1(a0) based on InvE1 and a value obtained by decoding pair1 based on InvE2 to calculate pair 0 based on E2. Accordingly, a value obtained by encoding a0⊕a1⊕a2⊕a3 based on E2 is the same as pair0.

In operation 450, the encoding apparatus determines whether a predetermined i-th bit of InvE1(E1(a0)) and a predetermined j-th bit of InvE2(pair1) are the same as each other. In this case, each of i and j is a predetermined natural number from 0 to 3.

In operation 450, if the predetermined i-th bit of InvE1(E1(a0)) and the predetermined j-th bit of InvE2(pair1) are the same, the encoding apparatus completes encoding processes for E1 (a0), E1(a1), E1(a2), and E1(a3).

If the predetermined i-th bit of InvE1 (E1 (a0)) and the predetermined j-th bit of InvE2(pair1) are different in operation 450, the encoding apparatus performs predetermined additional encoding and then completes encoding processes for E1(a0), E1(a1), E1(a2), and E1(a3) in operation 460.

In this case, the encoding apparatus may create additional encoding information that indicates whether the additional encoding is performed on each 4-bit of a value calculated according to Type IV_III.

The encoding apparatus performs a process that is described above with reference to FIG. 4 on all data included in the result of Type III and creates a value including E3(pair0) and pair0 that is not additionally encoded. Subsequently, the encoding apparatus performs encoding according to a next round in which a value created through an encoding process corresponding to Type IV_III is used as an input value.

In this case, E3 is an encoding table predetermined such that E1 is different from E2, and InvE3 is a decoding table for decoding the encoded data based on E3.

In this case, the encoding apparatus may create additional encoding information that indicates whether the additional encoding is performed on each 4-bit of a value calculated according to Type IV_III.

In addition, while the conventional Type II is a table including Input decoding, 8*8 mixing bijection, ShiftRows, AddRoundKey, SubBytes, MixColumns, 32*32 mixing bijection, and Output encoding, Type II according to an embodiment of the present invention checks whether the additional encoding is performed by Type IV_III using the additional encoding information before the encoding process according to the conventional Type II is performed, and when the additional encoding is performed in Type IV_III, further includes decoding the additionally encoded data based on InvE3.

An encoding process corresponding to the above-described Type IV_III is complicated. However, it is obvious to a person skilled in the art that the encoding apparatus may perform encoding using a look-up table Type IV_III that can derive the same result as acquired according to the above-described encoding process.

Figure 5:
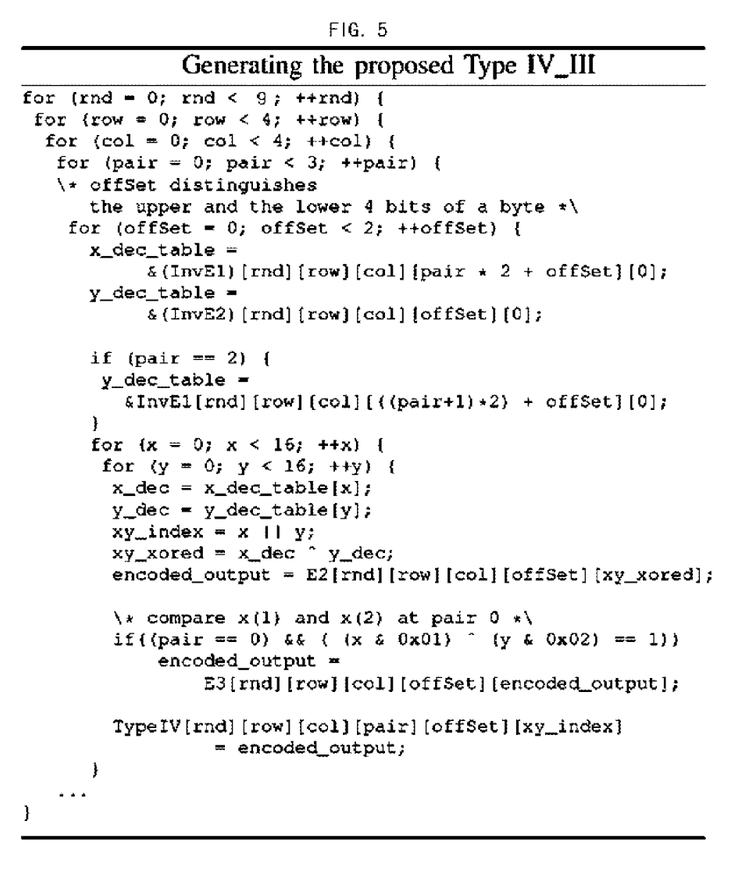
FIG. 5 is a view illustrating an algorithm that is used for an encoding apparatus according to an embodiment of the present invention to generate a table of Type IV_III.

FIG. 5 is a view illustrating an algorithm that is used for an encoding apparatus according to an embodiment of the present invention to generate a table Type IV_III.

An algorithm for creating Type IV_III is illustrated in FIG. 5. That is, the encoding apparatus may encode a value calculated according to Type III, using Type IV_III created through the algorithm as illustrated in FIG. 5. In this case, array InvE1, InvE2, and E2 of FIG. 5 is an array representing InvE1, InvE2, and E2 that are described above with reference to FIG. 4. In addition, an array TypeIV of FIG. 5 is an array indicating Type IV_III, which may be a multi-dimensional array having a size of 9*4*4*3*2*16. Accordingly, referring to the algorithm illustrated in FIG. 5, it is obvious that a person skilled in the art can implement Type IV_III that is used by an encoding apparatus according to an embodiment of the present invention.

Figure 6:
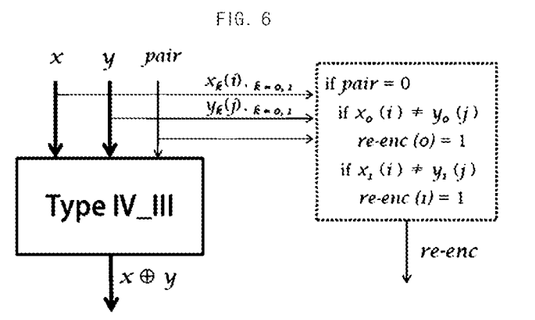
FIG. 6 is a view illustrating an input value, an output value, and additional encoding information when an encoding apparatus according to an embodiment of the present invention performs a process according to a table of Type IV_III.

FIG. 6 is a view illustrating an input value, an output value, and additional encoding information when an encoding apparatus according to an embodiment of the present invention performs a process according to a table of Type IV_III.

Referring to FIG. 6, the encoding apparatus may perform XOR on x and y depending on x (for example, InvE1(E1 (x0))), y (for example, InvE2(pair1)), and pair (for example, 0) and perform additional encoding (E3) on the result. In addition, the encoding apparatus compares an i-th bit of x with a j-th bit of y when pair is 0, and includes a value of 1 to the additional encoding information when the bits are not the same and includes a value of 0 to the additional encoding information when the bits are the same. In addition, the encoding apparatus perform the above-described process on x and y that are received, to include a value of 0 or 1 to the additional encoding information.

Accordingly, the encoding apparatus completes the encoding according to Type IV_III and then performs decoding according to the additional encoding information as shown in Table (1) in Type II of a next ground.

TABLE (1)

| Case | Decoding process | Additional encoding information |
|---|---|---|
| 1 | InvE2(E2(x0⊕x1⊕x2⊕x3)) | 0 |
| 2 | InvE3(InvE2(E3(E2(x0⊕x1⊕x2⊕x3)))) | 1 |

That is, when a specific bit of the additional encoding information is 1, the encoding apparatus performs additional decoding on E3(E2(x0⊕x1⊕x2⊕x3) which is 4-bit encoded data corresponding to the bit of 1. In this case, the additional decoding corresponds to the additional encoding. That is, when the encoded data is transformed by a table corresponding to the additional encoding according to a table corresponding to the additional decoding, data before the additional encoding is performed may be calculated, and the encoding apparatus performs the additional decoding according to the table corresponding to the additional decoding to decode E3(E2(x0⊕x1⊕x2⊕x3)) into E2(x0⊕x1⊕x2⊕x3).

Stability of algebraic analysis of the encoding apparatus according to an embodiment of the present invention may be determined based on whether Theorem 1 is applied. In a case in which (x1, x2, x3) is fixed as (c1, c2, c3) or (c1, c2, c3') and only x0 is changed in order to carry out the above-described algebraic analysis, if y0 is expressed as Equations (1) and (2) below, Theorem 1 may be applied.

$$y0(x0,c1,c2,c3) = Q_{0,j}{}^r(\alpha T_{0,j}{}^r(P_{0,j}{}^r(x0))) \oplus \beta_c \quad (1)$$

$$y0(x0,c1,c2,c3) = Q_{0,j}{}^r(\alpha T_{0,j}{}^r(P_{0,j}{}^r(x0))) \oplus \beta_c' \quad (2)$$

where a is a predetermined constant. In addition, using the same Q in Equation (1) and Equation (2) implies a fact that the encoding of round result values also uses the same table.

However, if y0 cannot be expressed as Equation (1) and Equation (2) under the same analysis conditions as the conventional white-box AES, Theorem 1 may not be applied as it is.

Additional encoding may be performed on a final result value of one round of an encoding apparatus according to an embodiment of the present invention, depending on properties of a 4-bit input, when pair among an input of Type IV_III for performing an XOR operation is 0.

Since a result value encoding table of one round is only E2, tables output by Q in Equation (1) and Equation (2) are the same. However, in the present invention, since the result value encoding table may be E2 or E3·E2, the result value may not be necessarily encoded using tables according to Equation (1) and Equation (2). This leads to the conclusion as follows.

$$y0(x0,c1,c2,c3) \cdot y0(x0,c1,c2,c3')^{-1} = Q_{0,j}{}^r(Q_{0,j}{}^{r-1}(x_0)) \oplus \beta$$

$$\beta = \beta_c \oplus \beta_c'$$

Accordingly, Theorem 1 is not valid in an encoding apparatus according to an embodiment of the present invention, and thus it is possible to defense the algebraic analysis.

As described above, when one of 4 bits of x and one of 4 bits of y are compared for additional encoding, a probability that an i-th bit of x and a j-th bit of y will be different from each other is ½, and thus a probability that a 4-bit value (x⊕y) will be additionally encoded is also ½. Accordingly, a probability that an 8-bit result value will be additionally encoded is ¾, and a probability that the 8-bit result value will be encoded one time without the additional encoding is ¼. If x of 4 bits and y of 4 bits are compared by n bits, a probability of performing additional encoding is $1\frac{1}{2}^{2n}$ while a probability of not performing additional encoding is $\frac{1}{2}^{2n}$. Thus, as the number of bits compared between 4-bit x and 4-bit y as a condition for the additional encoding increases, the probability of performing additional encoding rapidly increases. This allows an attacker to determine that there is a high probability that the final encoding of the result of the round is E3·E2, which may work as a vulnerability. Accordingly, when one-bit comparison is performed as the additional encoding condition in order to provide better stability, an attack is provided with the poorest analysis environment. It is also obvious to a person skilled in the art that according to an implementation, the condition for determining the additional encoding may be changed to comparison between 4-bit x and 4-bit y by two or more bits.

Figure 7:
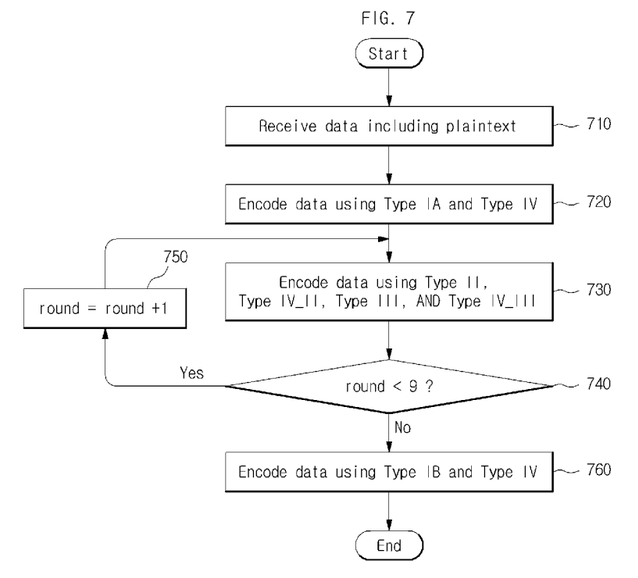
FIG. 7 is a flowchart illustrating a process in which an encoding apparatus according to an embodiment of the present invention encodes data.

FIG. 7 is a flowchart illustrating a process in which an encoding apparatus according to an embodiment of the present invention encodes data.

Referring to FIG. 7, in operation 710, the encoding apparatus receives data including a plaintext.

In operation 720, the encoding apparatus encodes data using Type IA and Type IV. That is, the encoding apparatus encodes data received in operation 710 according to Type IA and then encodes the encoded data according to Type IV.

In operation 730, the encoding apparatus encodes data using Type II, Type IV_II, Type III, and Type IV_III. In this case, it has been described above with reference to FIGS. 2 to 5 that Type IV_III is allowed to perform an additional encoding mechanism and Type II performs additional decoding on a result value acquired by Type IV_III, according to the additional encoding information, and then performs encoding.

In operation 740, the encoding apparatus determines whether a round number is less than 9. In this case, an initial round number may be 1.

When the round number is less than 9 in operation 740, the encoding apparatus increases the round number by 1 in operation 750. That is, in operation 750, the encoding apparatus perform encoding in the next round.

When the round number is 9 or more in operation 740, the encoding apparatus encodes a result value of Type IV_III using Type IB and Type IV and outputs the finally encoded data.

As described above, according to the present invention, it is possible to provide an encoding function that can offer easy defense against the attack based on algebraic analysis.

This invention has been particularly shown and described with reference to preferred embodiments thereof. There are many embodiments other than the above-described embodiments of the present invention within the scope of the appended claims. It will be understood by those skilled in the art that various changes in form and details may be made therein without departing from the spirit and scope of the invention as defined by the appended claims. Accordingly, the referred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An encoding apparatus based on a white-box advanced encryption standard (AES), the encoding apparatus comprising:
   a communication unit configured to receive data from an outside;
   a memory configured to store an instruction for encoding the data; and
   a processor configured to encode the data according to the instruction, wherein the instruction comprises:
   an instruction for encoding the data using a first table for looking up and calculating a result value obtained by encoding according to a predetermined pattern in an a-th round; and
   when among first to fourth data included in data obtained by encoding using the first table, an i-th bit of exclusive OR of the second to fourth data and a j-th bit of the first data are different, an instruction for encoding the data using a second table for looking up and calculating a result value calculated by performing additional encoding on exclusive OR of the first to fourth data,
   wherein a, i, and j are each a natural number of 1 or more,
   wherein when the additional encoding is performed on the data in the a-th round, the instruction further comprises an instruction for additionally decoding the data obtained by the additional encoding among data obtained by encoding using the second table in an (a+1)th round and then encoding the data obtained by encoding using the second table using the first table for looking up and calculating a result value obtained by encoding according to a predetermined pattern,
   wherein the instruction further comprises an instruction for creating additional encoding information indicating whether the additional encoding is performed, and
   wherein the encoding using the first table of the data obtained by encoding using the second table comprises determining whether the additional encoding is performed on the data in the a-th round with reference to the additional encoding information.

2. The encoding apparatus of claim 1, wherein the first table is a Type II, Type IV_II, or Type III table according to the white-box AES, and the second table is a Type IV_III table according to the white-box AES.

3. A method of encoding data by an encoding apparatus based on a white-box advanced encryption standard (AES), the method comprising:
   receiving data from an outside;
   encoding the data using a first table for looking up and calculating a result value obtained by encoding according to a predetermined pattern in an a-th round; and
   when among first to fourth data included in data obtained by encoding using the first table, an i-th bit of exclusive OR of the second to fourth data and a j-th bit of the first data are different, encoding the data using a second table for looking up and calculating a result value calculated by performing additional encoding on exclusive OR of the first to fourth data,
   creating additional encoding information indicating whether the additional encoding is performed; and
   additionally decoding the data obtained by the additional encoding among data obtained by encoding using the first table with reference to the additional encoding information and then encoding the data obtained by encoding using the first table, using the second table for looking up and calculating a result value obtained by encoding according to a predetermined pattern;
   wherein the encoding using the first table of the data obtained by encoding using the second table comprises determining whether the additional encoding is performed on the data in the a-th round with reference to the additional encoding algorithm information.

4. The method of claim 3, wherein the first table is a Type II, Type IV_II, or Type III table according to the white-box AES, and
   the second table is a Type IV_III table according to the white-box AES.

* * * * *